(12) United States Patent
Narasimhan et al.

(10) Patent No.: US 10,558,583 B1
(45) Date of Patent: Feb. 11, 2020

(54) SYSTEMS AND METHODS FOR MANAGING CACHE REPLACEMENT WITH MACHINE LEARNING (71) Applicants: Giri Narasimhan, Miami Beach, FL (US); Giuseppe Vietri, Miami, FL (US); Wendy A. Martinez, Miami, FL (US)

(72) Inventors: Giri Narasimhan, Miami Beach, FL (US); Giuseppe Vietri, Miami, FL (US); Wendy A. Martinez, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/263,690

(22) Filed: Jan. 31, 2019

(51) Int. Cl.
*G06F 12/00* (2006.01)
*G06F 12/123* (2016.01)
*G06F 12/0891* (2016.01)
*G06F 5/06* (2006.01)
*G06F 17/18* (2006.01)
*G06N 20/00* (2019.01)

(52) U.S. Cl.
CPC .............. *G06F 12/123* (2013.01); *G06F 5/06* (2013.01); *G06F 12/0891* (2013.01); *G06F 17/18* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,796,971 A | * | 8/1998 | Emberson | G06F 9/3802 711/122 |
| 6,003,115 A | * | 12/1999 | Spear | G06F 12/0862 711/113 |
| 2004/0098541 A1 | * | 5/2004 | Megiddo | G06F 12/122 711/129 |
| 2013/0346614 A1 | * | 12/2013 | Baughman | G06F 9/5083 709/226 |

OTHER PUBLICATIONS

Eyal Even-Dar et al, Learning Rates for Q-learning (Year: 2003).*
Ismail Ari et al., ACME: Adaptive Caching Using Multiple Experts, Distributed Data and Structures 4, 2002, pp. 143-158.
Pol Blasco et al., Learning-Based Optimization of Cache Content in a Small Cell Base Station, 2014 IEEE International Conference, 2014.

(Continued)

*Primary Examiner* — David Yi
*Assistant Examiner* — Craig S Goldschmidt
(74) *Attorney, Agent, or Firm* — Saliwanchik, Lloyd & Eisenschenk (57) ABSTRACT

Systems and methods for management of a computer-based cache are provided. A system can include a processor, a cache, a memory device, and a storage device. The processor can be configured to evict a page from the cache to a history index based upon a greater weight respectively assigned to a least frequently used (LFU) and least recently used policy (LRU) policy, detect a requested page that was evicted to the history index, and adjust the respective weights assigned to the policies based upon the requested page being in the history index.

14 Claims, 6 Drawing Sheets

(56) References Cited

OTHER PUBLICATIONS

Sebastien Bubeck et al., Regret Analysis of Stochastic and Nonstochastic Multi-armed Bandit Problems, Foundations and trends® In Machine Learning, 2012, vol. 5, No. 1.
Abraham D. Flaxman et al., Online convex optimization in the bandit setting: gradient descent without a gradient, Proceedings of the 16th annual ACM-SIAM syymposium on Discrete algorithms, Society for industrial and applied mathematics, 2005.
Nimrod Megiddo et al., Outperforming LRU with an Adaptive Replacement Cache Algrorithm, published by the IEEE Computer Society, 2004, pp. 4-11.
Alexander Rakhlin et al., Online Learning with Predictable Sequences, JMLR: Workshop and Conference Proceedings, 2013, pp. 1-27.

* cited by examiner

Algorithm 1: LeCaR(LRU,LFU)

```
Input: requested page q
if q is in C then
    C.UpdateDataStructure(q)
else
    if q is in H_LRU then
        H_LRU.Delete(q)
    else if q is in H_LFU then
        H_LFU.Delete(q)
    UpdateWeight(q, λ, d)
    if (Cache C is full) then
        action = (LRU, LFU) with prob
          (w_LRU, w_LFU)
        if (action == LRU) then
            if H_LRU is full then
                H_LRU.Delete(LRU(H_LRU))
            H_LRU.Add(LRU(C))
            C.Delete(LRU(C))
        else
            if H_LFU is full then
                H_LFU.Delete(LRU(H_LFU))
            H_LFU.Add(LFU(C))
            C.Delete(LFU(C))
    C.Add(q)
```

Fig. 1

Algorithm 2: UpdateWeight($q, \lambda, d$)

```
Input     : page q, learning rate λ, discount rate d
t := time spent by page q in History
r := d^t
if q is in H_LRU then
    w_LFU := w_LFU * e^(λ*r)   // increase w_LFU
else if q is in H_LFU then
    w_LRU := w_LRU * e^(λ*r)   // increase w_LRU
w_LRU := w_LRU / (w_LRU + w_LFU)   // normalize
w_LFU := 1 - w_LRU
```

SYSTEMS AND METHODS FOR MANAGING CACHE REPLACEMENT WITH MACHINE LEARNING

STATEMENT OF GOVERNMENT SUPPORT

This invention was made with government support under Grant No. CNS 1563883 awarded by National Science Foundation. The government has certain rights in the invention.

BACKGROUND

Items found in cache memories can be retrieved faster than from main memories. Cache memories are fast memories that store items temporarily with the expectation that the entry might be requested again soon, thus saving the time an effort to bring the entry from main memory. However, cache memories are limited in capacity and therefore need to be managed efficiently so that useful information is retained, and stale and useless information is quickly discarded.

Many systems still use the old "static" technology of LRU or LFU. More modern adaptive approaches (e.g., ARC ad CAR) consistently outperform their non-adaptive competitors but were conceived prior to the current revolution in machine learning (ML). ML approaches have been attempted, but the performance of the resulting methods have not been competitive with the best of the current technology. Furthermore, these attempts at ML-based cache replacement are considerably less efficient since they have to simultaneously simulate multiple expensive cache replacement algorithms and keep track of the best expert among them at any given time.

Caches are limited memory storage devices and need a management algorithm that decides which items should be stored and which are to be discarded. This replacement scheme cannot be handled by a single policy and needs to be adaptive to the input. ML has the capability to learn and anticipate changes in the input distribution and, thus, ML has the ability to make the best decisions for cache replacement. Caches are in every conceivable device that has a computing unit and any winning cache replacement algorithm would have far-reaching impact and applications.

Higher hit rates in caches translate to faster memory accesses and faster computations. This problem has not seen a major improvement in over a decade. Small caches are particularly relevant in small devices (mobile, IoT) and could have an impact on the field.

The best-known strategies for cache replacement are LRU and CLOCK, both of which tend to retain pages with high recency, and LFU, which retains pages based on how frequently they have been referenced. These static strategies cannot adapt to changes in workloads and fail to have good all-round performance, especially when recent pages are not frequently accessed or when pages are accessed a number of times and then lapse into long periods of infrequent access.

BRIEF SUMMARY

Embodiments of the subject invention provide systems and methods for efficient cache management. When the system needs room for a new item, it can evict a page using one of two standard policies: least frequently used (LFU) or least recently used (LRU). The decision on which one to use on any given eviction is dictated by their weights. These weights reflect what is known about the best policy to use at any given time and are constantly being adapted as the learning progresses. When a page is evicted, a reference to the page is moved to history along with information on the policy that evicted it from the cache. When the system attempts to serve a request, it looks for the item in the cache. If it is found in cache, there is no change in the weights of the policies. If it is not found in cache or in the history, again there is no change in the weights of the policies. If it not found in cache, but is found in history, then the weights of the policies are updated. At this point, the policy that placed the item in history is penalized by increasing the "regret" associated with it, i.e., by lowering its weight.

BRIEF DESCRIPTION OF DRAWINGS

FIG. 3($a$) is a plot showing the weights of the LRU and LFU policies as the LeCaR system progresses through the request sequence. FIG. 3($b$) is a plot showing the hit rates under four different algorithms.

FIG. 4($a$) is a plot showing the weights of the LRU and LFU policies as the LeCar system progress through a sequence. FIG. 4($b$) is a plot showing hit rates under four different algorithms.

DETAILED DESCRIPTION

The following disclosure and exemplary embodiments are presented to enable one of ordinary skill in the art to make and use a cache according to the subject invention. Various modifications to the embodiments will be readily apparent to those skilled in the art and the generic principles herein may be applied to other embodiments. Thus, the devices and methods related to the cache management system are not intended to be limited to the embodiments shown, but are to be accorded the widest scope consistent with the principles and features described herein.

While many conventional schemes utilize a set of best strategies (i.e., experts), which can be an expensive proposition, systems according to embodiments of the subject invention, which can be referred to as a LeCaR (learning cache replacement) system, assume that at every instant, the workload is best handled by a judicious "mix" (i.e., a probability distribution) of only two fundamental policies: recency-based and frequency-based evictions. Further, the LeCaR system attempts to learn the optimal probability distribution for every state of the system. Unlike other conventional schemes, the LeCaR system maintains a probability distribution of two policies instead of a probability distribution of a panel of expert strategies. This minimalist approach to learning unexpectedly achieves outstanding results. The LeCaR system, by simulating only two relatively inexpensive strategies, manages to outperform the best of the existing cache replacement algorithms.

Another feature of the system is that the weight associated with the two policies is not a function of their current hit rate, but of the current associated regret. Thus, cache replacement is modeled as an online learning problem involving regret minimization. To handle any cache miss, one of the two policies is chosen at random (probabilities derived from their associated cumulative regret values due to the misses they "caused").

Figure 1:
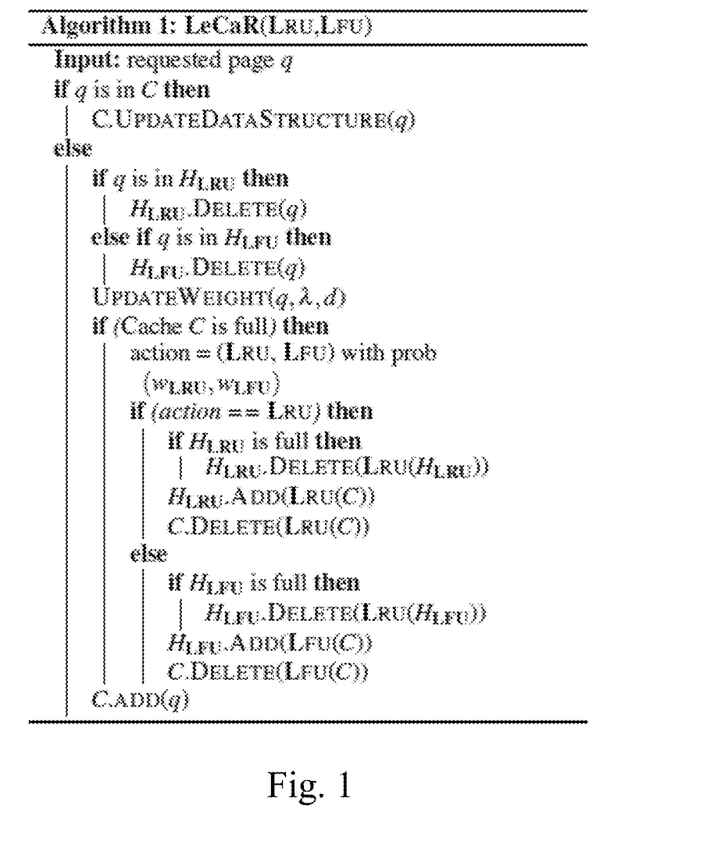
FIG. 1 shows an algorithm describing how policies are penalized in the cache management system.

In order to manage regret, the cache manages a first in first out (FIFO) history of metadata on the most recent evictions from the cache. When an entry is evicted from the cache it is moved to history. The number of entries in the history is equal to the number of entries in the cache. Each history entry is labeled by the policy that evicted it from the cache. A decision is considered "poor" if a request causes a miss and if the requested page is found in history. The intent is that a miss found in history could have been rectified by a more judicious eviction, and hence the regret. Regret is graded and is larger if it entered the history more recently. When poor decisions are caused by a specific policy, that specific policy is penalized by increasing the "regret" associated with it (see, for example, FIG. 1).

Figure 2:
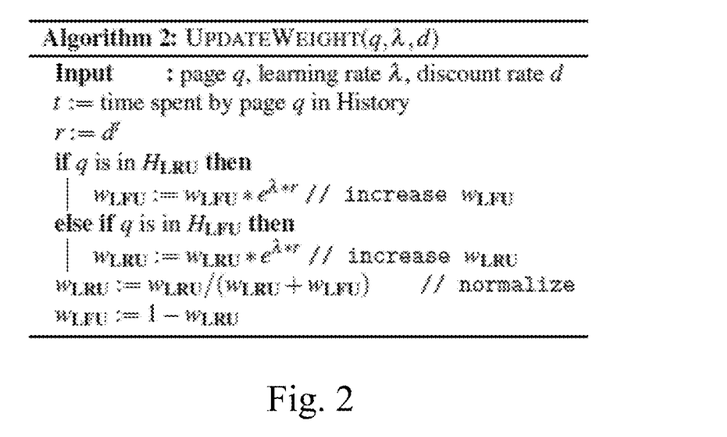
FIG. 2 shows an algorithm describing how the weights are updated by the cache management system.

Weight (probability of use) of a policy is correlated with the regret of the "other" policy. Algorithm 2, as seen in FIG. 2, describes how the weights are updated by the LeCaR system. The weights start off being equal, although they may be initialized using some a priori information about the algorithms or the request sequence. When a "regrettable" miss is attributable to least recently used (LRU) (respectively least frequently used (LFU)), because it is found in history (HLRU) (respectively (HLFU)), the weight of the "other" policy (i.e., LFU (respectively LRU) is updated as recommended by regret minimization). As described in FIG. 2, $\lambda$, is the learning rate (initially 0.45), d is the discount rate (initially 0.000, and reward is described as r=d. The learning rate is a parameter that controls by how much the weights of the policies are adjusted with respect to a cache miss. The discount rate is a parameter that represents how much future cache misses lose their value with respect to the increase in weight for the policy not attributed to the cache miss.

This range of values for the learning rate and discount rate and chose ones that worked reasonably well across nine workloads that were experimented upon. It should be appreciated by one of ordinary skill in the art that these values can be optimized to improve the LeCaR system performance. The weights of the two policies determine the probability with which that policy is applied for the next miss.

In certain embodiments, a system or method can further include increasing the weight of the policy (e.g., from between LRU and LFU) not used to evict the requested page from the cache.

Figure 7:
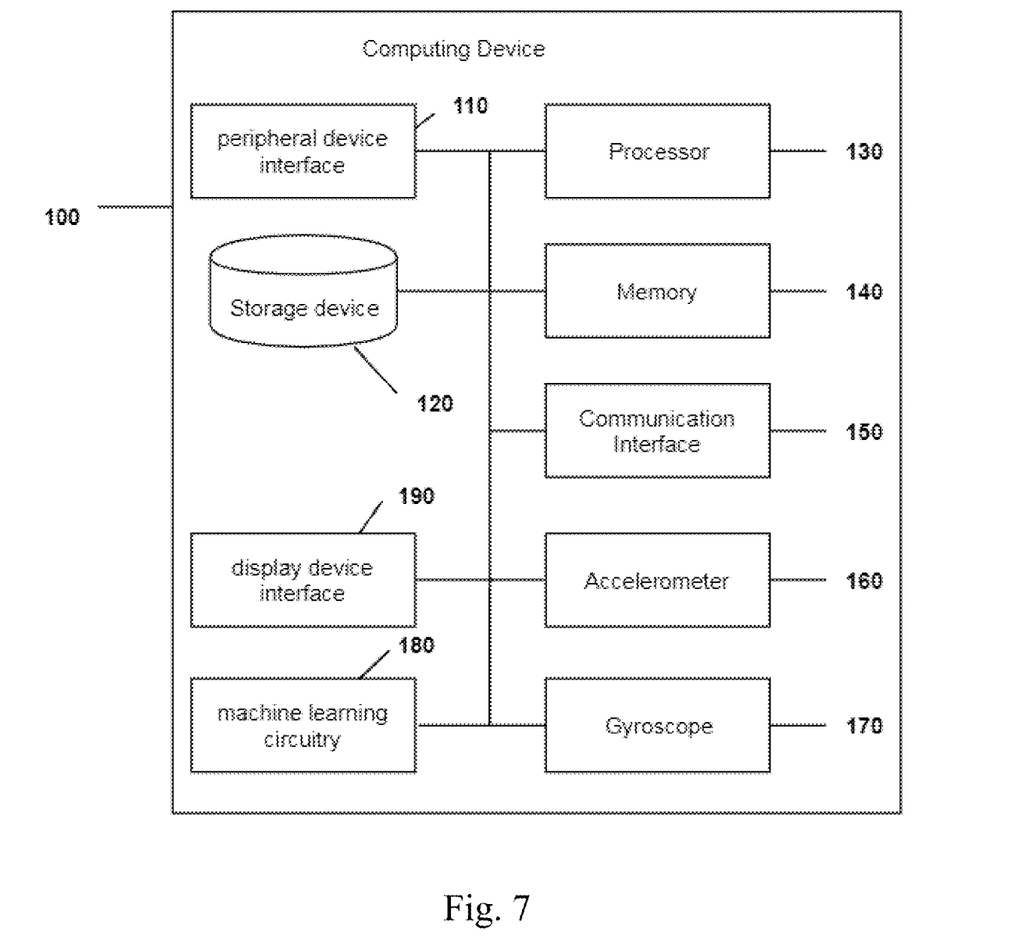
FIG. 7 shows a block diagram of a computing device according to an embodiment of the subject invention.

FIG. 7 shows a computing device 100 that can be used to implement features described herein. The computing device 100 can include a peripheral device interface 110, a storage device 120 a processor 130, a memory device 140, a communication interface 150, an accelerometer 160, a gyroscope 170, machine learning circuitry 180, and a display device interface 190.

The memory device 140, including the cache, may be or include a device such as a Dynamic Random Access Memory (D-RAM), Static RAM (S-RAM), or other RAM or a flash memory. The storage device 120 may be or include a hard disk, a magneto-optical medium, an optical medium such as a CD-ROM, a digital versatile disk (DVDs), or BLU-RAY disc (BD), or other type of device for electronic data storage.

The communication interface 150 may be, for example, a communications port, a wired transceiver, a wireless transceiver, and/or a network card. The communication interface 150 can be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

The peripheral device interface 110 may be an interface configured to communicate with one or more peripheral devices. The peripheral device interface 110 may operate using a technology such as Universal Serial Bus (USB), PS/2, BLUETOOTH, infrared, serial port, parallel port, and/or other appropriate technology. The peripheral device interface 110 may, for example, receive input data from an input device such as a keyboard, a mouse, a trackball, a touch screen, a touch pad, a stylus pad, and/or other device.

The display device interface 180 may be an interface configured to communicate data to a display. The display device interface 180 may operate using technology such as Video Graphics Array (VGA), Super VGA (S-VGA), Digital Visual Interface (DVI), High-Definition Multimedia Interface (HDMI), or other appropriate technology.

An embodiment of the computing device 100 can be configured to perform any feature or any combination of features described above as performed by the user device 130. The memory device 140 and/or the storage device 120 can comprise stored instructions that when executed cause at least one processor 130 to perform any feature or any combination of features described herein.

Although FIG. 7 shows that the computing device 100 includes a single processor 130, single memory device 140, single communication interface 150, single peripheral device interface 110, single display device interface 180, and single storage device 120, the computing device may include multiples of each or any combination of these components, and may be configured to perform analogous functionality to that described herein.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Experiments were performed using synthetic data to demonstrate the LeCaR system's ability to learn. Sequences that periodically switch back and forth from being favorable to LRU to being favorable to LFU were generated. During the phase when it is favorable to LRU, the sequence generates requests that deliberately cause a hit for LRU and a miss for LFU, and vice versa. The generator also includes a small amount (0.5%) of noise, (i.e., requesting pages from the universe that are neither in LRU nor in LFU's cache). For these data sets, size of the cache was set at 500 entries, with a universe of pages of size 15 times the size of the cache.

Figure 3A:
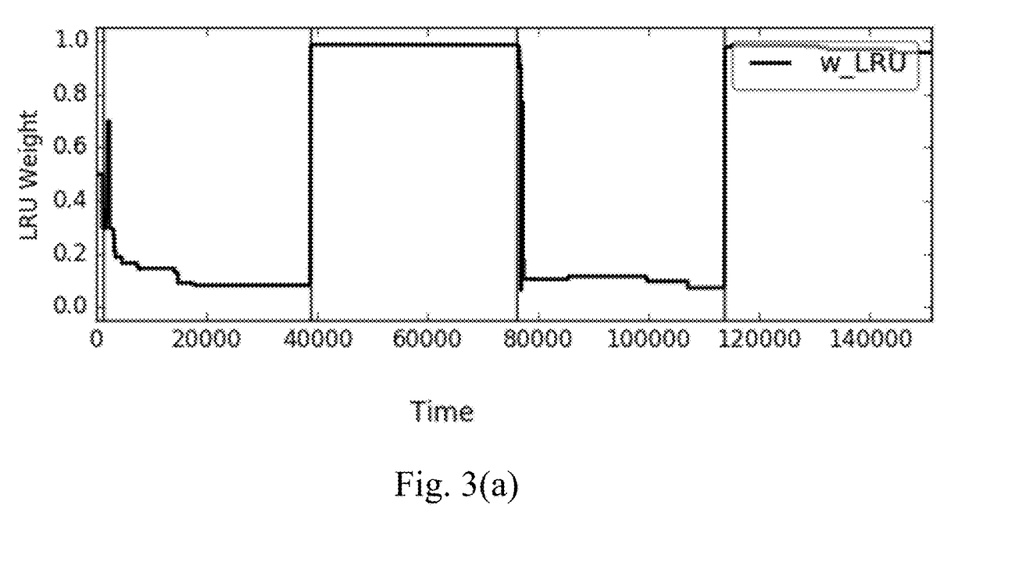
Figure 3B:
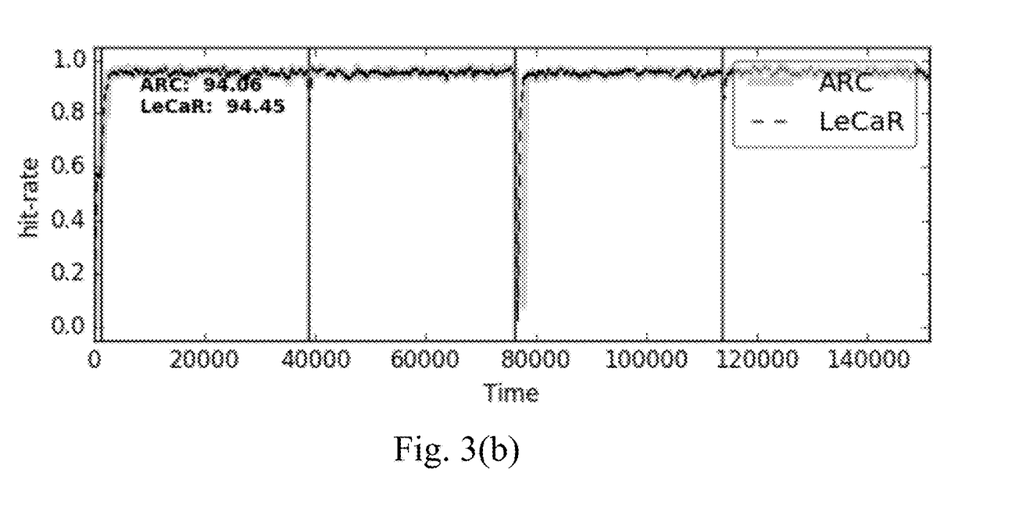

FIGS. 3(a) and 3(b) shows a plot that is broken into four equal sections, each partitioned by four vertical lines. Each partition corresponds to a sequence that is favorable to one of LRU or LFU, as described above. FIG. 3(b) shows the hit rates with each of the four algorithms under study. Hit rates for the two critical algorithms in question (i.e., ARC and LeCaR) are represented by the two curves as indicated (hit rates were computed over a sliding window of size 500). FIG. 3(a) shows the weight of LRU (the weight of LFU simply being 1 minus the weight of LRU) as the LeCaR system progresses through the request sequence. As seen in FIG. 3(b), the hit rates using an adaptive replacement (ARC) scheme and LeCaR are very close to each other. FIG. 3(b), shows how quickly ARC and LeCaR adapt to the change. The learning for the LeCaR system is also reflected in fluctuations in the weights w LRU, as seen in FIG. 3(a). Additional experimentation showed that the learning occurred even if there are more than 4 partitions, suggesting that the learning is relatively robust to the frequency of these switches. When learning rates in the LeCaR system are set high, the system is more responsive to changes, but have slightly lower hit rates. When they are set too low, the response to changes can be sluggish. A learning rate of 0.45 falls within the middle of high and low learning rates.

Example 2

In real data sets, phase changes are a frequent occurrence, where all or part of the working set gets replaced. Experiments were performed to study adaptiveness of the algorithms to different levels of phase change. As in Example 1, plots are shown to explain the general behavior.

For these experiments, cache size was set at 50, with a universe of 2000 pages. Working set size was set at 30, and on each phase change 90% of the working set remained unchanged. Each phase had 5000 requests.

Figure 4A:
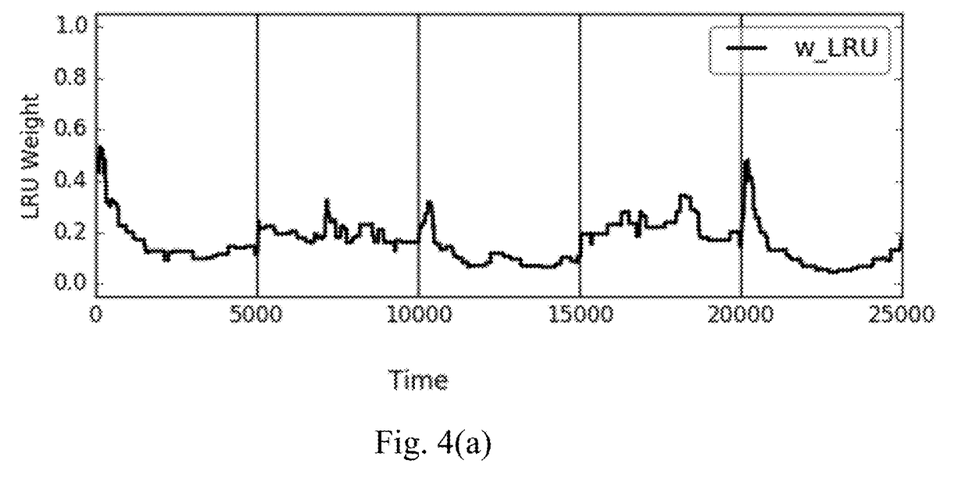
Figure 4B:
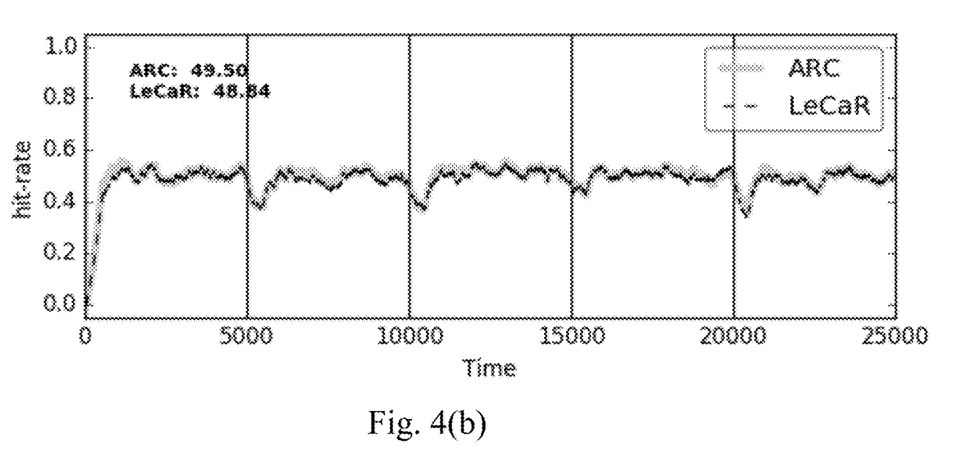

FIGS. 4(a) and 4(b) are plots of the results of the experiment. FIG. 4(b) shows hit rates and FIG. 4(a) reflects the inner workings of the LeCaR system with the weight of the LRU policy. Phase change causes a dip in the hit rate of all the algorithms. There is not much difference in the rate at which ARC and LeCaR schemes recover, but the LeCaR system recovery rate can be regulated with the learning rate (data not shown).

Example 3

Multi-day, block-level, production storage I/O FIU Traces for were used for the experiments. They include traces from an email server (mail workload), a virtual machine running two web servers (web-vm workload), and several user machines at the School of Computing and Information Sciences at Florida International University (FIU), collected for a duration of three weeks.

Figure 5:
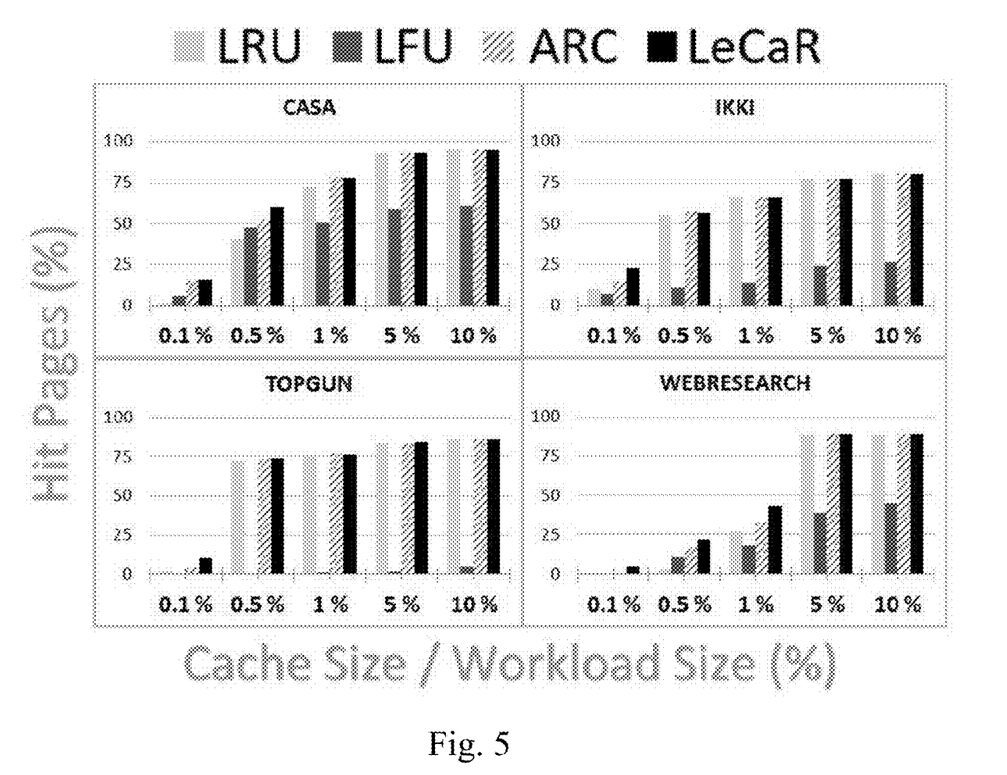
FIG. 5 shows plots of cache size verses workload size percentages for different data sets.

The data sets, in FIG. 5, labeled casa, ikki, madmax, topgun are workloads from home directories; data set online is from the server hosting the departments online course management system; webresearch is a document store for research projects; webusers is the home-pages of faculty/staff/students; and mail is the department's mail server.

The findings are discussed in relation to Day 3 (a Monday) of each trace first. The LeCaR system outperforms ARC by as much as 5% to 1876% in hit rate across the 8 production workloads from FIU when caches are small (0.1% of the workload size) and by −4% to 30.5% when caches are 1% of the workload size. In other words, for larger caches the LeCaR system sometimes performs on part with ARC, but does sometimes outperform ARC. In fact, for large cache sizes (1%) relative to the size of the workload, all the top performers including the LeCaR system often perform more or less on par. When cache sizes are low (≤0:5%), the LeCaR system outperforms all the other competitors including ARC. FIG. 4 represents only 4 of the 8 traces.

Similar characteristics were observed when longer experiments were run with data sets representing days 1 through 7 from the collection mentioned above (data not shown). For most real data sets saturation of the hit rate seems to happen somewhere between cache sizes of 1% to 5% of the workload sizes.

Example 4

Figure 6:
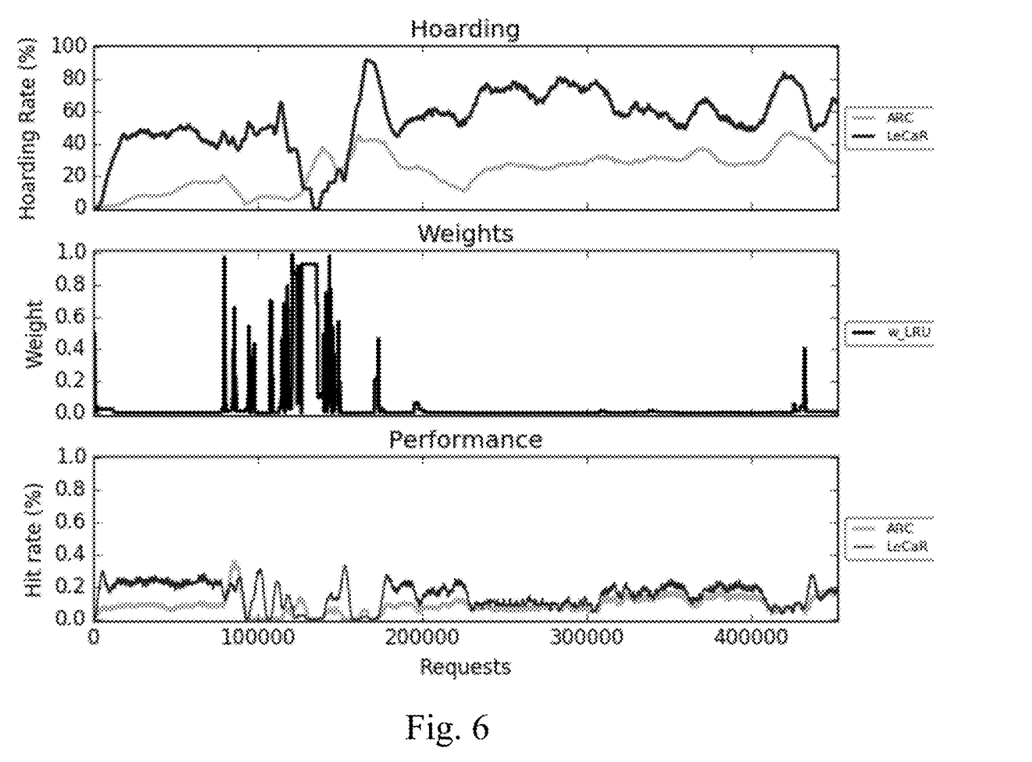
FIG. 6 shows three plots to describe the use of hoarding rates to explain performance of the cache management system.

In order to better understand the behavior of the LeCaR system, the concept of a hoarding rate is introduced. The hoarding rate is defined as the percentage of entries in cache that have been accessed at least twice in the past since entering the cache, but are not among the last 2N unique pages accessed. By definition, LRU has zero hoarding rate because every page in the cache (including those with frequency ≥2) is among the last N pages accessed. LFU tends to have high hoarding rates because it cannot discard items with higher frequency as long as there is at least one lower frequency entry. LFU hoarding rate does not often decrease, except when hoarded pages are requested. Algorithms like ARC and LeCaR do selective hoarding, hedging their bets that some of these pages are likely to be accessed in the future. As seen in FIG. 6, the hoarding curves are smoothed by averaging over a sliding window to avoid distractions of frequent fluctuations.

As seen in A of FIG. 6, the LeCaR system is hoarding more than the other algorithms, but it is a relatively stable period where the hoarding is paying off in terms of higher hit rates. In B, LFU gets penalized because of prior poor choices (reflected by lowering of its weight), and the LeCaR system reacts by applying more recency criteria, thus getting rid of much of its hoarded pages. After an initial dip in hit rate, it recovers and tracks the performance of ARC, which uses its own mechanisms to react to the situation in B, possibly by evicting items from its high frequency queue (T2). In C, some (frequent) pages are being requested after a long time, reflected by higher hit rate for LFU and a dip in its hoarding (as with the LeCaR system and ARC). However, the increase in weight for LFU pays off for the LeCaR system, which sees the highest increase in performance over its competition. Region D is similar to A in terms of the stability of the weights, except that the higher hoarding rate of all the algorithms is reflected in more similar hit rates.

Experiments 1-4 show that large caches do not benefit from strong replacement strategies since working sets are already in cache; all good strategies perform roughly equally with insignificant differences. When cache sizes are small, subtleties of the replacement algorithms are observable. The LeCaR system relies on frequency, which is important to effective cache replacement. However it tempers its reliance by using randomization and recency to clean up stale but frequent items in the cache.

The LeCaR system manages two data structures of metadata for each cache entry (i.e., recency and frequency). While not running LRU or LFU directly, its cost is equivalent to running both. The cost of the LeCaR system is also of the same order of magnitude as ARC with regard to memory and computational overhead.

The reinforcement online algorithm with regret minimization when applied to pure LRU and LFU policies results in high performance cache replacement. The LeCaR system boasts up to 18× improvement over the top competitor ARC for production storage I/O traces when caches are $1/1000^{th}$ of the workload size. The gap between the LeCaR system and ARC widens when size of the cache (relative to workload) decreases, suggesting that the LeCaR system is scalable to much larger workloads.

Hoarding rate is shown as a means to understand the relative behavioral properties of these caching algorithms and to generate new insights into cache replacement analysis. The design of the LeCaR system is minimalist and can operate using two policies LRU and LFU (without decay).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A computer-based cache management system, comprising:
a computing system comprising a processor, a cache, a memory device, and a storage device; the processor being configured to:
evict a plurality of pages from the cache to a history index, each page of the plurality of pages being respectively evicted based upon a greater weight out of a first weight assigned to a least frequently used (LFU) policy and a second weight assigned to a least recently used (LRU) policy, each of the first weight and the second weight respectively being a numerical value;
receive a request for a page of the plurality of pages that was evicted to the history index;
detect the requested page that was evicted to the history index; and
adjust the first weight and the second weight based upon whether the requested page is in the history index,
the adjusting of the first weight and the second weight comprising the numerical value of the weight that is greater, out of the first and the second weight, for the requested page, and
the adjusting of the first weight and the second weight further comprising increasing the numerical value of the weight that is less, out of the first weight and the second weight, for the requested page, and
the increasing of the numerical value of the weight that is less, out of the first weight and the second weight, for the requested page comprising multiplying said numerical value by $e^{\lambda \cdot r}$, $\lambda$ being an initial learning rate and r being a reward value, and the initial learning rate being 0.45.

2. The system of claim 1, a quantity of entries in the history index being equal to a quantity of entries in the cache.

3. The system of claim 1, an initial value of the first weight being unequal to an initial value of the second weight.

4. The system of claim 1, an initial value of the first weight being equal to an initial value of the second weight.

5. The system of claim 1, the reward value being dependent on an initial discount rate, and the initial discount rate being $0.005^{1/N}$, N being a quantity of pages accessed by the system.

6. The system of claim 1, the history index being managed on a first in first out (FIFO) basis.

7. The system of claim 1, a size of the cache being less than or equal to 0.5% of total memory.

8. A computer-based method to perform cache management, the method comprising:
evicting, by a processor, a plurality of pages from a cache to a history index, each page of the plurality of pages being respectively evicted based upon a greater weight out of a first weight assigned to a least frequently used (LFU) policy and a second weight assigned to a least recently used (LRU) policy, each of the first weight and the second weight respectively being a numerical value;
receiving, by the processor, a request for a page of the plurality of pages that was evicted to the history index;
detecting, by the processor, the requested page that was evicted to the history index; and
adjusting, by the processor, the first weight and the second weight based upon the requested page being in the history index,
the adjusting of the first weight and the second weight comprising the numerical value of the weight that is greater, out of the first and the second weight, for the requested page, and
the adjusting of the first weight and the second weight further comprising increasing the numerical value of the weight that is less, out of the first weight and the second weight, for the requested page, and
the increasing of the numerical value of the weight that is less, out of the first weight and the second weight, for the requested page comprising multiplying said numerical value by $e^{\lambda \cdot r}$, $\lambda$ being an initial learning rate and r being a reward value, and the initial learning rate being 0.45.

9. The method of claim 8, further comprising setting a quantity of entries in the history index to be equal to a quantity of entries in the cache.

10. The method of claim 8, further comprising setting an initial value of the first weight to be unequal to an initial value of the second weight.

11. The method of claim 8, further comprising setting an initial value of the first weight to be equal to an initial value of the second weight.

12. The method of claim 8, the reward value being dependent on an initial discount rate, and the method further comprising setting the initial discount rate to be $0.005^{1/N}$, N being a quantity of pages accessed during the method.

13. The method of claim 8, a size of the cache being less than or equal to 0.5% of total memory.

14. A computer-based cache management system comprising:
- a computing system comprising a processor, a cache, a memory device, and a storage device;
- the processor being configured to:
  - evict a plurality of pages from the cache to a history index, each page of the plurality of pages being respectively evicted based upon a greater weight out of a first weight assigned to a least frequently used (LFU) and a second weight assigned to a least recently used (LRU) policy, each of the first weight and the second weight respectively being a numerical value;
  - receive a request for a page of the plurality of pages that was evicted to the history index
  - detect the requested page that was evicted to the history index;
  - decrease the numerical value of the weight that is greater, out of the first weight and the second weight, for the requested page; and
  - increase the numerical value of the weight that is less, out of the first weight and the second weight, for the requested page,
- a quantity of entries in the history index being equal to a quantity of entries in the cache,
- an initial value of the first weight being equal to an initial value of the second weight,
- the increasing of the numerical value of the weight that is less, out of the first weight and the second weight, for the requested page comprising multiplying said numerical value by $e^{\lambda \cdot r}$, $\lambda$ being an initial learning rate and r being a reward value,
- the initial learning rate being 0.45,
- the reward value being dependent upon an initial discount rate,
- the initial discount rate being $0.005^{1/N}$, N being a quantity of pages accessed by the system,
- the history index being managed on a first in first out (FIFO) basis, and
- a size of the cache being less than or equal to 0.5% of total memory.

* * * * *